(12) United States Patent
Campbell

(10) Patent No.: US 6,277,309 B1
(45) Date of Patent: Aug. 21, 2001

(54) REFLOW REFINISHING FOR COMPACT DISCS

(76) Inventor: Richard Vest Campbell, P.O. Box 645, Defuniak Springs, FL (US) 32435

( * ) Notice: Subject to any disclaimer, the term of this patent is extended or adjusted under 35 U.S.C. 154(b) by 0 days.

(21) Appl. No.: 09/352,311

(22) Filed: Jul. 12, 1999

(51) Int. Cl.[7] .................................................. B29D 11/00
(52) U.S. Cl. .................... 264/1.33; 264/1.36; 264/2.7; 264/446; 264/492; 264/2.1; 425/446; 425/810
(58) Field of Search ......................... 264/1.1, 1.33, 264/1.36, 1.37, 2.6, 2.7, 106, 107, 446, 345, 492, 2.1; 425/810, 445, 446

(56) References Cited

U.S. PATENT DOCUMENTS

| | | | |
|---|---|---|---|
| 4,145,169 | * | 3/1979 | Shows ................................. 425/810 |
| 4,225,298 | * | 9/1980 | Henderson ............................ 425/810 |
| 5,693,285 | * | 12/1997 | Ishii et al. ............................ 264/446 |
| 6,064,615 | * | 5/2000 | Gudesen . |
| 6,086,797 | * | 7/2000 | Bango, Jr. ............................ 264/1.33 |

FOREIGN PATENT DOCUMENTS 2 155 025 * 9/1985 (GB) .................................... 264/446

* cited by examiner

*Primary Examiner*—Mathieu D. Vargot
(74) *Attorney, Agent, or Firm*—John Wiley Horton, Attorney

(57) ABSTRACT

A process and device for resurfacing damaged compact discs by melting a thin layer of the optical surface of said compact disc so that it reflows and fills any scratches or other imperfections. The result is a smooth and optically transparent surface equivalent to the condition of a new compact disc.

11 Claims, 7 Drawing Sheets

SEE DETAIL FIG. 2

REFLOW REFINISHING FOR COMPACT DISCS

BACKGROUND

1. Field of Invention

This invention relates to a method and apparatus for refinishing a scratched optical surface on a compact disc. Specifically, heat is used to reflow the scratched optical surface of the disc, thereby allowing surrounding material to flow into and eliminate the scratches. The result is a reconditioned surface comparable to that found on a new compact disc.

2. Description of Prior Art

Numerous prior art patents have addressed the object of reconditioning scratched plastic surfaces. The need for such a process was realized long before the advent of the modern "compact disc." For example, U.S. Pat. No. 3,904,732 to Wick et. al. (1975) discloses a method for temporarily restoring optical clarity to scratched or glazed canopies on military helicopters. The Wick invention restores optical clarity by filling the scratches or voids in the canopy surface with a mixture of liquid tetrachloroethylene and trichloroethylene. The liquid mixture has a refractive index similar to the canopy itself, so that for as long as the liquid fills the voids, it renders the canopy clear. The effect is transitory, however, as the liquid does not remain in place for long.

Another method for refinishing a plastic surface is using vaporized solvents to reflow the surface and fill any voids. This method is disclosed in U.S. Pat. No. 4,247,580 to Chao (1981). The Chao invention uses an organic solvent, such as methyl ethyl ketone, to dissolve and reflow a thin layer of plastic on the surface of an object. While effective, the solvents required are highly volatile and are classified as environmental contaminants. Thus, the Chao invention may only be practiced in a contained environment under controlled circumstances.

Perhaps the simplest approach to restoring an optically clear surface is disclosed in U.S. Pat. No. 4,301,193 to Zuk (1981). The Zuk invention uses an abrasive composition applied with a polishing pad to cut away the optical surface until the scratches are removed and a new, smooth surface is revealed. A similar approach is disclosed in U.S. Pat. No. 5,334,335 to Norville (1994). The Norville process combines polishing with the use of organic solvents, representing a combination of prior art inventions.

Most of these prior art methods have been applied to compact discs. In U.S. Pat. No. 5,746,811 to Smithlin (1998), a waxy material, having a refractive index similar to the plastic found on compact discs, is used to fill scratches and voids. In U.S. Pat. No. 5,641,345 to Henry (1997), a polishing composition is used to remove the portion of the surface containing the scratches. U.S. Pat. No. 5,571,041 to Leikam (1996) also uses the polishing method, with the added step of applying a protective cover to the optical surface when the polishing is completed.

While these prior art methods can recondition the surface of a compact disc, they have several inherent limitations. For the wax fill method, the filler material tends to come loose over time, meaning that the compact disc performance will deteriorate. For the polishing methods, the surface of the disk must actually be abraded away, resulting in a thinner disc. The process may only be performed a few times before the disc is worn away. And, in the event of a deep scratch, the polish method takes a great deal of time to perform.

The method of using solvents to reflow and smooth the scratched optical surface requires dangerous chemicals, such as methyl ethyl ketone. With rising environmental concerns, the use of such volatile chemicals is becoming increasingly restricted.

Thus, the known methods for refinishing the optical surface of a compact disc are limited in that they wear away the surface of the disk, require the use of dangerous chemicals, require a long time to perform, fill only small scratches, only partially fill the scratches, or provide only a temporary remedy.

Objects and Advantages

Accordingly, several objects and advantages of the present invention are:

(1) to provide a lasting restoration of compact disc quality, comparable to a new compact disc;

(2) to avoid the use of chemical solvents;

(3) to provide a process which may be repeated several times without wearing away the disc; and (4) to provide a process which may be rapidly performed.

DRAWING FIGURES

REFERENCE NUMERALS IN DRAWINGS

| | | | |
|---|---|---|---|
| 10 | compact disc | 12 | center hole |
| 14 | data area | 16 | perimeter area |
| 18 | top layer | 20 | data layer |
| 22 | substrate | 24 | center area |
| 26 | lower fixture | 28 | alignment pin |
| 30 | disc cavity | 32 | clamping fixture |
| 34 | alignment hole | 36 | access hole |
| 38 | clamped assembly | 40 | burner |
| 42 | flame | 44 | upper surface |
| 46 | optical surface | 48 | pit |
| 50 | melt layer | 52 | scratch |

Description

FIGS. 1 through 4

Figure 1:
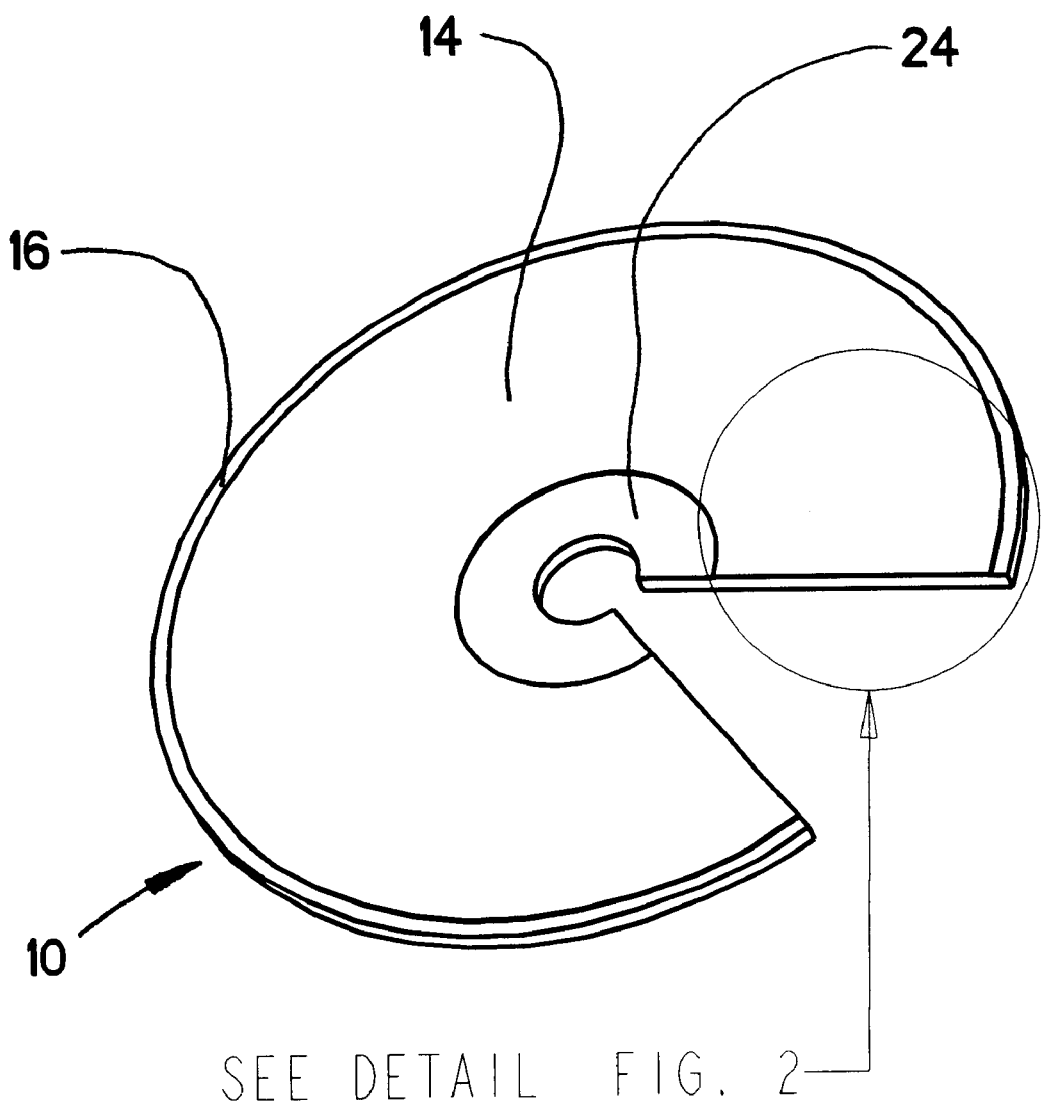
FIG. 1 is an isometric view, showing a compact disc.
Figure 2:
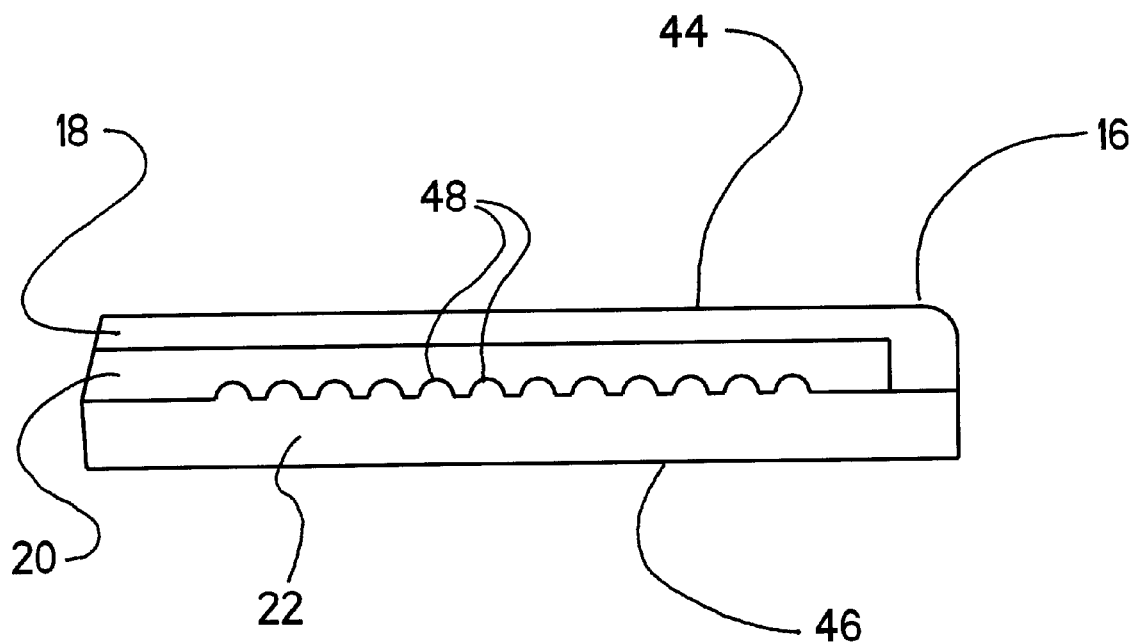
FIG. 2 is a detail section view, showing the laminated structure of a compact disc.

FIG. 1 depicts a modern compact disc, or "CD." The term "compact disc" will be used to describe audio compact discs, computer discs, digital video discs, etc., all of which have a similar construction. Compact disc 10 has three distinct regions, denoted as center area 24, data area 14, and perimeter area 16. FIG. 2 shows a detailed section view through compact disk 10. The reader will observe that compact disk 10 is actually a laminate of three layers. The lowest layer is substrate 22. The middle layer is data layer 20. The upper layer is top layer 18. Data layer 20 is sandwiched between the other two. Data layer 20 actually contains the encoded data stored on compact disc 10. A laser is directed upward through optical surface 46. Substrate 22 is a clear material which allows the laser light to pass through until it strikes data layer 20. Data layer 20 is made of reflective material, typically aluminum or silver. Data is recorded on data layer 20 as a series of binary pits 48. As compact disc 10 is spun in a disc player, the series of binary pits 48 streams past the laser, allowing the data to be retrieved.

Pits 48 are very small, so it is critical that optical surface 46 is free of defects in order for the laser to read the encoded data. As a compact disc is handled, optical surface 46 can be scratched. If enough scratches accumulate, compact disc 10 will become unreadable, rendering it useless. Thus, the ability to restore the optical clarity of optical surface 46 is highly desirable.

Figure 3:
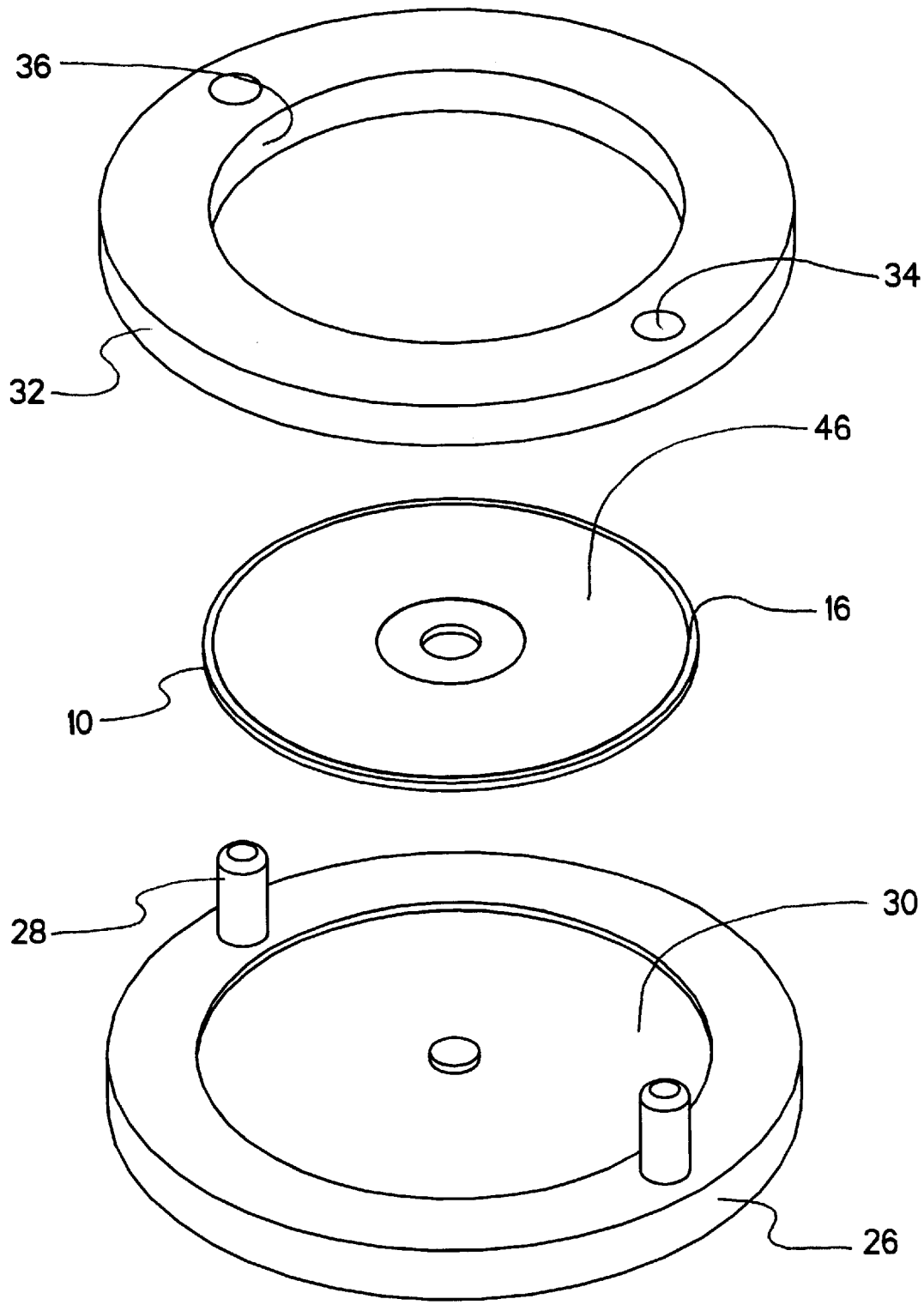
FIG. 3 is an exploded isometric view, showing the clamping device used to hold a compact disc during the resurfacing process.

The present invention seeks to reflow and smooth optical surface 46 by raising its temperature above the melting point of the material forming substrate 22. The desired effect is to melt just enough of the surface to allow the material surrounding the scratches to flow into and repair the scratches. At the same time, it is highly desirable to maintain the balance of substrate 22 below its melting temperature in order to prevent distortion of the disc. Turning to FIG. 3, the device for carrying out these objectives will be explained.

Lower fixture 26 has disc cavity 30, which is sized to accept compact disc 10. The diameter of disc cavity 30 is slightly larger than the diameter of compact disc 10, so that compact disc 10 may be placed in disc cavity 30 without forming an interference fit. Lower fixture 26 also has alignment pins 28, which are employed to align lower fixture 26 with clamping fixture 32.

Compact disc 10 is placed in disc cavity 30 of lower fixture 26, with optical surface 46 facing upwards. Clamping fixture 32 is then placed on top of compact disc 10. Alignment holes 34 in clamping fixture 32 mate with alignment pins 28 in lower fixture 26 in order to ensure that clamping fixture 32 is aligned with lower fixture 26. Clamping fixture 32 has access hole 36 cut through its middle portion. The diameter of access hole 36 is slightly less than the diameter of compact disc 10. Thus, clamping fixture 32 clamps against perimeter area 16 of compact disc 10. Data area 14 is completely exposed through access hole 36. Perimeter area 16 is partially concealed by clamping fixture 32, and is therefore not exposed to the resurfacing process. This is of little consequence, however, as scratches in perimeter area 16 do not interfere with data retrieval.

Once compact disc 10 is in position, clamping fixture 32 is tightened against compact disc 10 to press it firmly into disc cavity 30. The clamping force may be generated by any conventional means but, as it is desirable to quickly load and unload a succession of compact discs, air cylinders have been found to be particularly effective.

Figure 4:
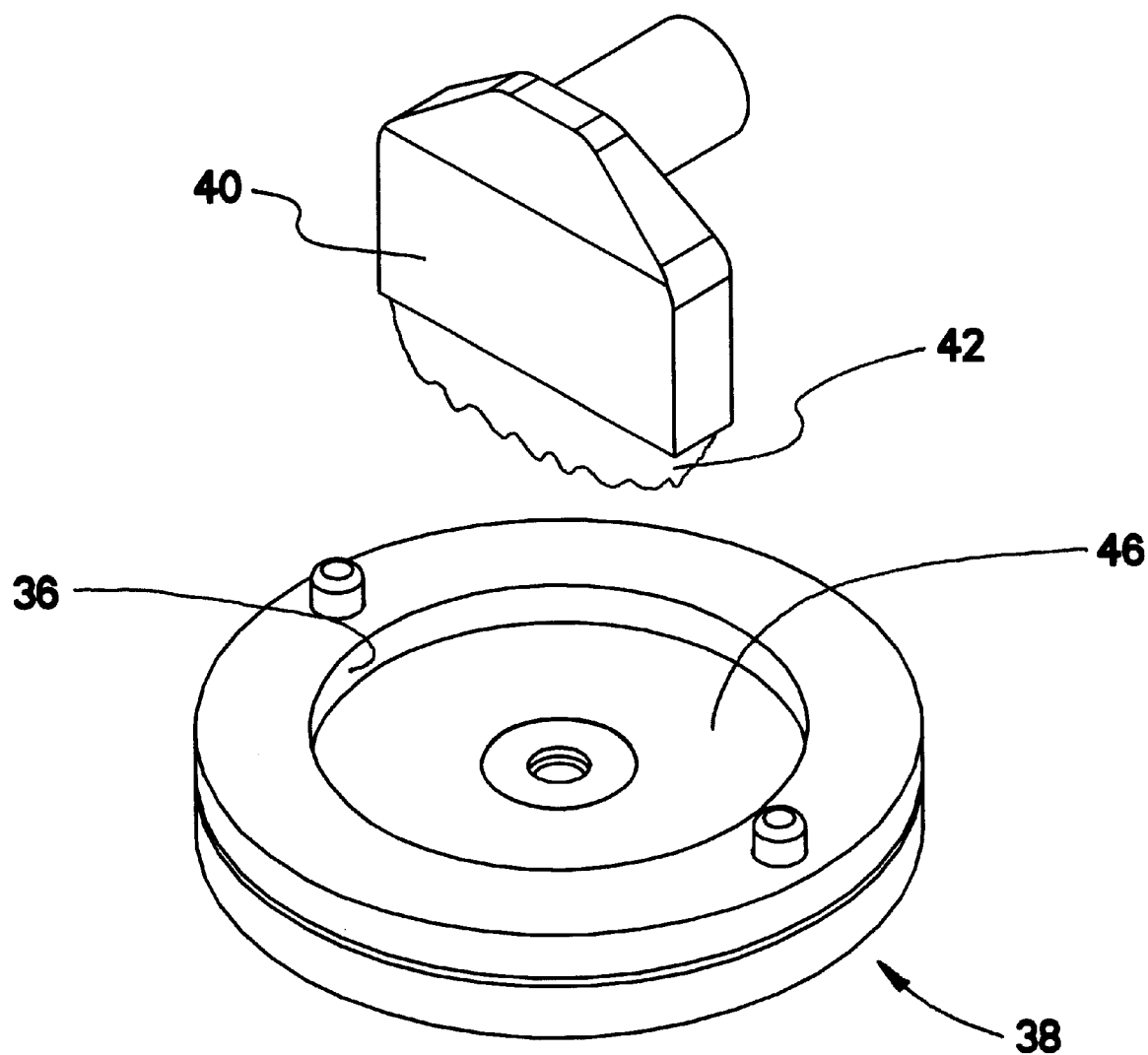
FIG. 4 is an isometric view, showing the resurfacing operation.

FIG. 4 depicts the previously described components in the clamped position. Clamped assembly 38 is passed beneath burner 40. Burner 40 generates flame 42 by igniting butane, mapp gas, or other similar combustibles. Flame 42 briefly passes over optical surface 46, which is exposed through access hole 36. Flame 42 transfers enough heat to optical surface 46 to melt a very thin layer of the material forming substrate 22. This melted layer then flows into the scratches on optical surface 46 and creates a smooth, reconditioned surface. Uniform distribution of the heat is critical. It therefore may be necessary to rotate clamped assembly 38 relative to burner 40, as shown by the arrow. Alternatively, burner 40 could be moved relative to a stationary clamped assembly 38.

Once optical surface 46 has been melted sufficiently to reflow, compact disc 10 must be rapidly cooled in order to prevent further melting of substrate 22. Clamped assembly 38 is therefore put through a quenching process, in which compact disc 10 is rapidly cooled by water, other conductive fluids, or cold gas, to a temperature below the melting point of substrate 22. Compact disc 10 is then retained in clamped assembly 38 for several more seconds in order to allow all portions of compact disc 10 to obtain a uniform temperature. Experimentation has determined that compact disc 10 should be retained in clamped assembly 38 for at least 30 seconds after cooling. If compact disc 10 is quickly removed from clamped assembly 38, warpage will often result.

Figure 5:
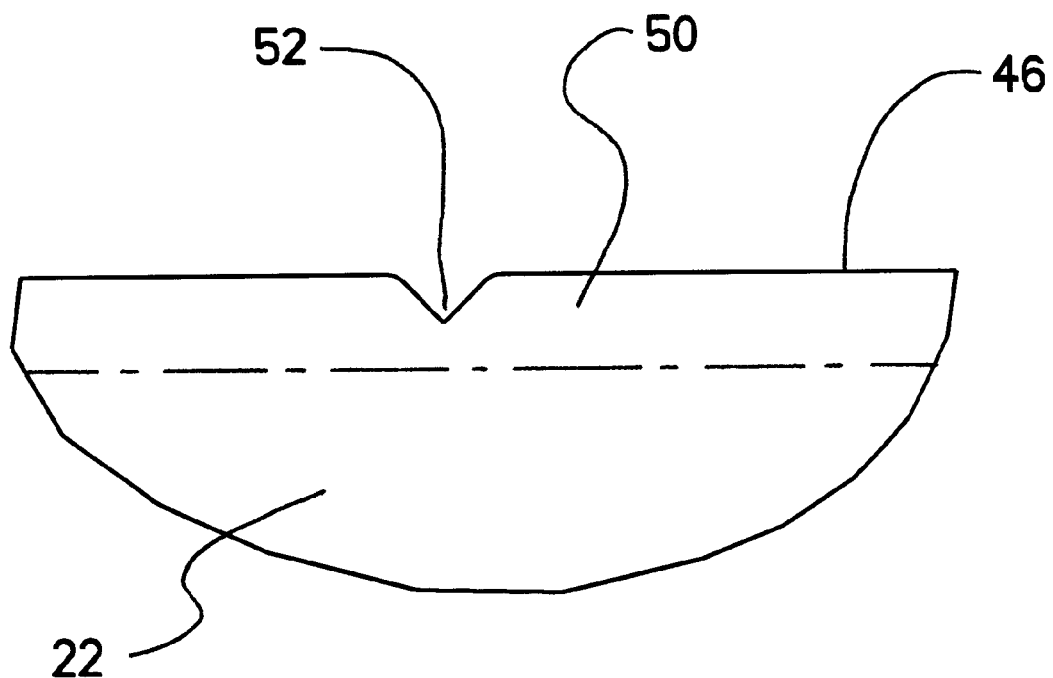
FIG. 5 is a detail section view, showing the shape of scratches in the surface of a compact disc.

Turning to FIG. 5, a detailed description of how the reflow process repairs the scratches will be provided. FIG. 5 shows a greatly enlarged section through substrate 22. Scratches 52 are cut into optical surface 46 of substrate 52. When substrate 52 is exposed to flame 42 (not shown in FIG. 5), melt layer 50 is created. The temperature of the material within melt layer 50 is higher than its melting point. Thus, the material within melt layer 50 is in a liquid state. During this process, compact disc 10 is in a horizontal orientation, meaning that optical surface 46 is parallel to the surface of the earth. The material within melt layer 50 which surrounds scratches 52 therefore tends to flow into scratches 52.

Figure 6:
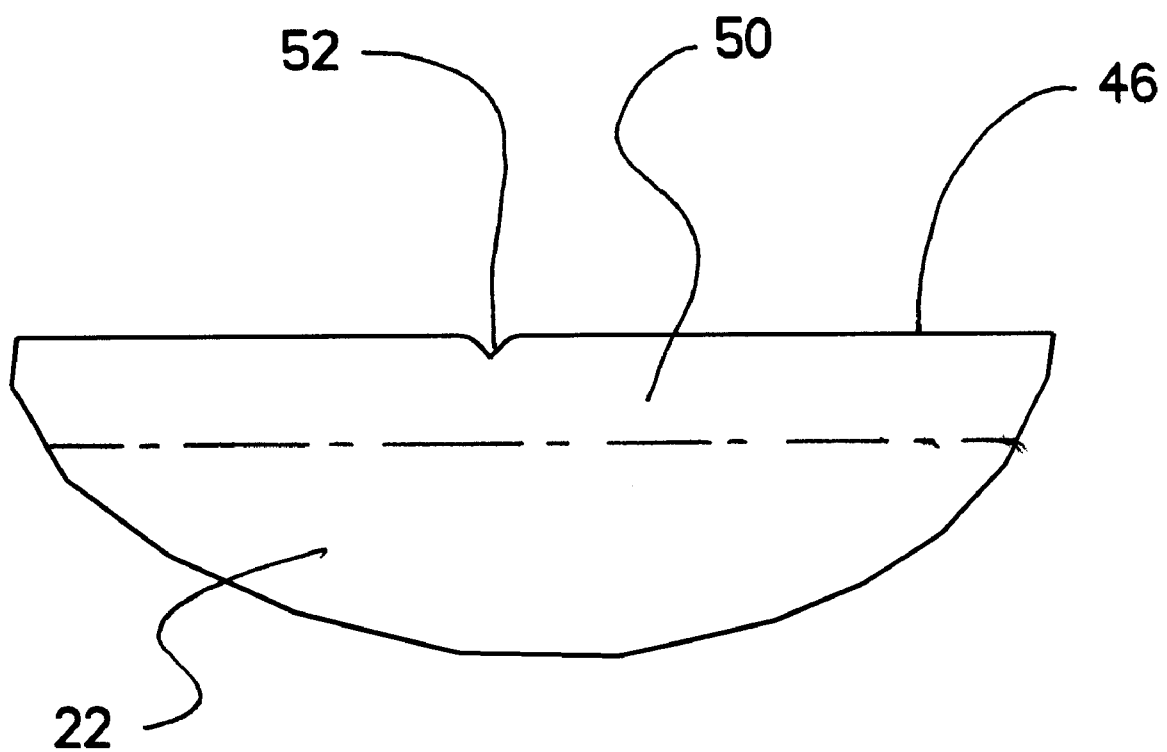
FIG. 6 is a detail section view, showing how the melting of the surface layer of a compact disc fills in the scratches shown in FIG. 5.
Figure 7:
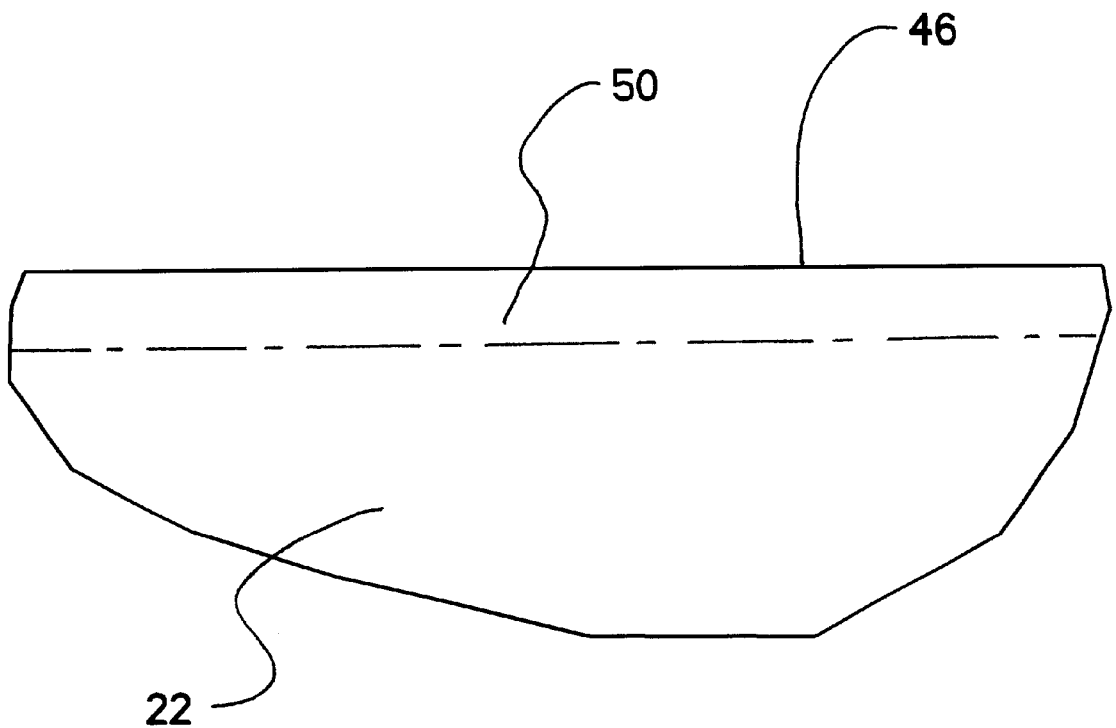
FIG. 7 is a detail section view, showing the completion of the reflow process.

FIG. 6 shows scratches 52 partially filled by the liquid flow of melt layer 50. FIG. 7 shows the resulting smooth surface, after the reflow is complete. At this point, compact disc 10 is quenched before further melting can occur.

Although burner 40 is employed in the present invention, other heat sources could be substituted. For example, compact disc 10 could be rapidly heated by an electrical radiant heater.

Material selection is important for the components described. Lower fixture 26 is typically made of metal, such as steel or aluminum. Clamping fixture 32 should be nonconductive, in order to minimize heat transfer to perimeter area 16 of compact disc 10, which might cause clamping fixture 32 to stick to compact disc 10. Heat-resistant polymers or ceramic compositions have been found to be effective for clamping fixture 32.

Summary, Ramifications, and Scope

Accordingly, the reader will appreciate that the proposed invention allows a scratched compact disc to be restored to playable condition. Furthermore, the proposed invention has additional advantages in that:

1. It avoids the use of chemical solvents;
2. The process may be repeated many times without wearing away the compact disc;
3. The process is inexpensive to perform, in that it only consumes the gas used to fire the burner; and
4. The process may be rapidly performed.

Although the preceding description contains significant detail, it should not be construed as limiting the scope of the invention but rather as providing illustrations of the preferred embodiment of the invention. For example, many different mechanisms could be employed to hold compact disc 10 during the resurfacing operation, clamped assembly 38 could be placed on a rotating stage, burner 40 could be a different shape, etc. Thus, the scope of the invention should be fixed by the following claims, rather than by the examples given.

Having described my invention, I claim:

1. A process for removing scratches and other imperfections from the optical surface of the substrate of a compact disc, comprising clamping said compact disc between a lower fixture and a clamping fixture, wherein said clamping fixture has an access hole allowing access to said optical surface through said clamping fixture, exposing said optical surface of said compact disc to a heat source sufficient to raise the temperature of said optical surface above the melting point of said substrate, so that said optical surface reflows, whereby said scratches and other imperfections are filled to form a smooth surface.

2. A process as recited in claim 1, comprising the additional step of quenching said compact disk in a cooling fluid immediately after said optical surface has been exposed to said heat source and reflows.

3. A process as recited in claim 1, wherein said heat source is a gas burner.

4. A process as recited in claim 1, wherein said heat source is an electrical radiant heater.

5. A process as recited in claim 1, comprising the additional step of rotating said compact disc in order to ensure uniform exposure of said compact disc to said heat source, and so that centrifugal forces generated in said rotating compact disc promote rapid and uniform filling of said scratches and other imperfections on said optical surface.

6. A process as recited in claim 1, comprising the additional step of moving said heat source relative to said compact disc, in order to ensure uniform exposure of said compact disc to said heat source.

7. A device for removing scratches and other imperfections from the optical surface of the substrate of a compact disc, comprising:

a. a lower fixture, having a disc cavity sized to receive said compact disc;

b. a clamping fixture, having an access hole passing completely therethrough, with said access hole being sized so that when said compact disc is clamped between said lower fixture and said clamping fixture, said access hole provides access to said optical surface through said clamping fixture; and c. a heat source which heats said optical surface of said compact disk above its melting point, thereby reflowing said optical surface so that said scratches and other imperfections are filled.

8. A device as recited in claim 7, further comprising quenching means for rapidly reducing the temperature of said optical surface of said compact disc after it has been heating above its melting point by said heat source.

9. A device as recited in claim 7, wherein said heat source is a gas burner.

10. A device as recited in claim 7, wherein said heat source is an electrical radiant heater.

11. A device as recited in claim 7, further comprising mechanical actuation means for clamping said clamping fixture against said lower fixture when said compact disc is placed therebetween.

\* \* \* \* \*